United States Patent [19]

Whittome

[11] 4,054,387
[45] Oct. 18, 1977

[54] MEASURING WITH MICROSCOPE

[75] Inventor: James Whittome, Los Gatos, Calif.

[73] Assignee: Vickers Instruments, Inc., Woburn, Mass.

[21] Appl. No.: 642,792

[22] Filed: Dec. 22, 1975

[51] Int. Cl.² .................. G01B 9/04; G01B 11/04
[52] U.S. Cl. .................. 356/156; 356/170; 356/252
[58] Field of Search ............ 356/156, 163, 170, 251, 356/252

[56] References Cited

U.S. PATENT DOCUMENTS

| | | | |
|---|---|---|---|
| 3,068,743 | 12/1962 | Dyson | 356/163 |
| 3,288,021 | 11/1966 | Hopkins | 356/163 |
| 3,326,079 | 6/1967 | Dyson et al. | 356/163 |
| 3,973,713 | 8/1976 | Furuya et al. | 350/81 UX |

OTHER PUBLICATIONS

Dyson "The Precise Measurement of Small Objects", AEI Engineering, vol. 1, No. 1, Jan. 1961.

Primary Examiner—John K. Corbin
Assistant Examiner—Stewart Levy

[57] ABSTRACT

A measurement module projects into a microscope a fiduciary image having a visually extensive area. Measurements are made by translating the fiduciary relative to the object between two positions in which different fiduciary image boundaries are tangent to respective object image sides, as determined by null positions in which neither dark overlap nor bright separation zones appear between the two semi-transparent images. The width of the object can be determined from the distance of relative movement of the fiduciary between these positions. In preferred form the fiduciary image has first and second boundaries in fixed relation at a predetermined spacing and the measurement is corrected by the spacing between the two fiduciary boundaries.

10 Claims, 7 Drawing Figures

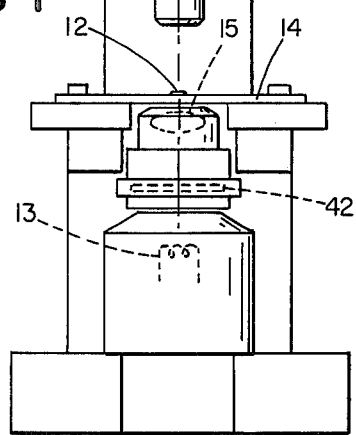
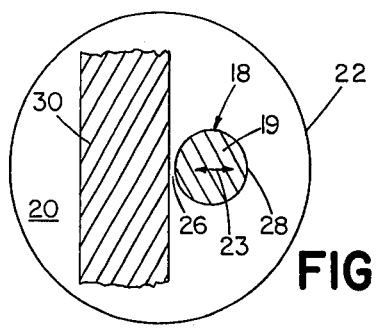
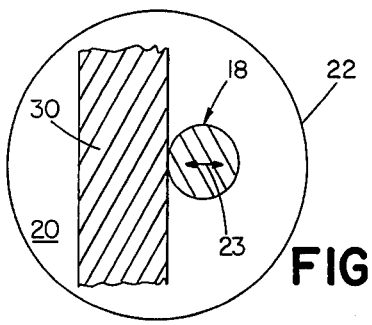
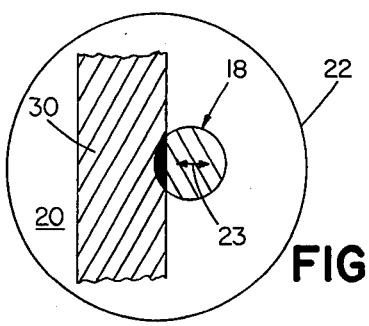
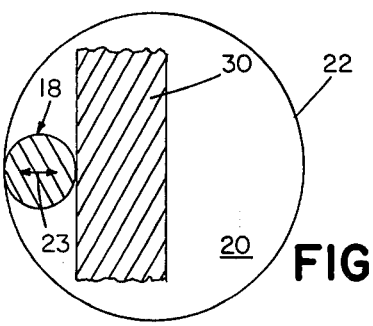
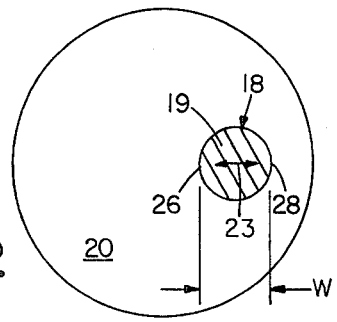

MEASURING WITH MICROSCOPE

BACKGROUND OF THE INVENTION

This invention relates to the measuring of objects seen with the aid of a microscope.

It has been the practice in measuring small objects seen in the microscope to place or project the image of a fine fiduciary line onto the image plane of the microscope. The line is then adjusted with the aid of a micrometer screw into coincidence with the edge of the image of the object to be measured and then translated with the aid of the micrometer screw to a position of coincidence with the opposite edge of the object's image. The displacement of the fiduciary line between the first coincidence and the second gives the size of the object. The accuracy of such a measurement is limited by the uncertainty in positioning the fine fiduciary line in a position coincident with the edge of the image of the object being measured.

Another practice in measuring objects seen in the microscope has been to split the image of the object and to move the images relatively by means of a suitable micrometer screw. By observation of the dark area produced where there is overlap of the semi-transparent images and the bright background produced where there is separation of the images, coincidence of the edges of the two images can be determined. The displacement of the images between a position of total superposition with edge coincidence to a position in which the sides of the images are externally tangent gives the size of the object. The accuracy of such a measurement can be more accurate than the above-mentioned fiduciary line technique because of better visual cues, but with the added requirement of image-splitting optics.

Objects of the present invention are to provide an apparatus which enables measurements with high accuracy and convenience and with simple components in a manner offering improvement in certain applications over both of the mentioned techniques.

SUMMARY OF THE INVENTION

According to the invention a fiduciary image of special form is projected onto the field of view at the microscope concurrently with the image of an object to be measured and a calibrated mechanism translates the fiduciary image relative to the object image along a straight line to effect measurement of the object. The fiduciary image defines first and second boundaries each demarcating visually appreciable areas of relatively light and dark values, these boundaries being preferably fixed and the sequence of light and dark areas at one boundary being the reverse of the sequence at the other. Relative translation of the fiduciary image with respect to the object enables a null position to be determined between positions in which the dark area at either boundary overlaps a respective side of the image of the object (producing a dark overlap zone) and positions in which the dark area is separate from the side of the object (producing a bright separation zone). First and second null positions are thus visually determinable by juxtaposing the first and second boundaries of the fiduciary with respective sides of the image of the object. Measurement of the width of the object is then accomplished by determination of the positions of the calibrated mechanism at the two null positions, correction being made for the known spacing between the two boundaries when fixed.

Preferably means are provided to project the two images in contrasting colors, preferably complementary colors so that coincident light backgrounds approximate white and coincident overlapped areas approximate black, while the fiduciary and object images appear in contrasting colors.

In preferred embodiments means also are provided for representing the distance between the measurement positions automatically corrected for fixed spacing between the boundaries, enabling rapid use by the operator, and preferably means are provided for automatically computing the object size and output means for displaying the computed size of the object. Specific embodiments of the invention include means for adjusting the brightness of the fiduciary image to match that of the object being measured, a fiduciary with symmetrical boundaries, and fiduciaries in forms of circular spots and bars. Images of alternative shapes may be projected according to the shape of the object to be measured.

BRIEF DESCRIPTION OF THE DRAWINGS

FIG. 1 shows a preferred embodiment of a measuring microscope according to the invention.

FIG. 2 shows a preferred fiduciary image according to the invention projected in the field of view of the microscope of FIG. 1.

FIGS. 3, 4, 5, and 6 show views of the image plane of the microscope under various conditions of adjustment.

FIG. 7 shows an alternative preferred fiduciary image.

DESCRIPTION OF PREFERRED EMBODIMENT

Microscope 10 according to the invention is shown in FIG. 1 viewing object 12, which is to be measured, supported on stage 14 and illuminated by light source 13 and condensing lens 15. Microscope 10 includes measurement module 16 which projects fiduciary image 18 into the field of view 22 of microscope 10 by means of light source 19, collector lens 21, fiduciary transparency 23, projecting lens 25 and half silvered mirror 27. The position of fiduciary image 18 in the field of view 22 can be translated in the direction shown by double arrow 23 by rotation of accurately calibrated micrometer screw 24 which carries the transparency 23. As shown more particularly in FIG. 2, image 18 is bounded by symmetrical sharp boundaries 26 and 28 separated by an extended dark area 19 of uniform brightness and is surrounded by light background field 20 also of uniform brightness. Thus the sequences of light and dark areas in the direction of arrow 23 are opposite at the two boundaries. The methods and apparatus for projecting a fiduciary image onto the field of view of a microscope and of translating this fiduciary image are well-known to those skilled in the art and need not be further discussed here. Module 16 additionally includes a control 32 for adjusting the brightness of image 18, a first coincidence signaling control 34, and a second coincidence signaling control 36, a numerical display 38, and electronic equipment receiving inputs from the controls and the micrometer and calculating and displaying the size of the object as will be further discussed below.

In operation image 18 is projected onto the microscope field of view along with the image 30 of object 12 being measured and the operator looking through the microscope sees, as shown in FIG. 3, both the image of the object to be measured 30 and the fiduciary image 18. He first adjusts the brightness of image 18 to equal that of object 30 using control 32. By manipulation of micrometer screw 24 the operator then positions the left boundary 26 of image 18 to be externally tangent to the right edge of image 30 as shown in FIG. 4. The condition of tangency can be discerned with great accuracy since when the fiduciary image is too far to the right, as illustrated in FIG. 3, a bright gap appears between the image of the object to be measured, and the fiduciary image; and if the fiduciary image is too far to the left, as illustrated in FIG. 5, a dark region is seen corresponding to the area in which the images overlap. The tangency condition is readily recognized and the fiduciary image is positioned as shown in FIG. 4 so that neither a bright gap nor dark overlap appears. When the condition of tangency as described has been realized, the operator depresses control button 34 causing a signal indicative of the position of micrometer screw 24 to be entered into the calculator. The operator then proceeds with the micrometer screw to translate the fiduciary image 18 to a position where boundary 28 has a similar condition of tangency with the opposite side of the image of the object to be measured as shown in FIG. 6. Symmetry of the boundaries 26, 28 facilitates comparable settings of coincidence on the opposite sides of the object. When this adjustment has been realized the operator presses second control 36 causing the new position of the micrometer screw to be entered into the calculator and the calculation and display of the measurement. The size of the object is essentially given by subtracting the width of the fiduciary image from the displacement between the edge coincident positions, achieved automatically by entering the value of the width W into the calculator by control 40. Techniques for sensing micrometer settings, entering the width correction and making such a calculation are well known and need not be discussed.

The automatic correction circuitry permits additional corrections to be entered, whereby the measurement results may be made to correspond to measurements achieved by either the prior art filar microscope or image shearing techniques, by adjusting for their different edge factors.

Fiduciary image in the form of a circular spot as shown in FIG. 2 is advantageous for measuring the width of elongated objects while an image in the form of a bar with parallel sides and substantial width as shown in FIG. 7 is advantageous for measuring diameters of rounded objects, still other forms of fiduciary images may be employed and in an equivalent manner the image may take the form of a clear circle or slot upon a dark background for certain applications. Module 16 may be adapted to project any of several images depending on the shape of the object to be measured.

Advantageously filters 42 and 44 are provided of complementary colors, e.g., of red and green, whereby the composite background appears white, the fiduciary image 18 appears green, the object image 30 appears red and zones of overlap appear black, contributing to the visual cues to achieve extremely precise setting accuracy.

What is claimed is:

1. An inspection or measurement microscope including means for producing and projecting a fiduciary image of fixed form onto the field of view of the microscope concurrently with means for projecting the image of an object to be measured and a calibrated mechanism adapted to translate the fiduciary image relative to the object image along a straight line to effect measurement of said object, said means for producing said fiduciary image adapted to produce said fiduciary image in the form of first and second pre-defined fixed boundaries each demarcating visually appreciable areas of relatively light and dark value, said boundaries being movable relative to the object image in the direction of said straight line and the sequence of light and dark areas at one of the boundaries being the reverse of the sequence at the other boundary, said calibrated mechanism enabling said fiduciary image to be relatively translated to determine between each said fiduciary boundary and a respective boundary of the image of said object a visually determinable null position when the boundary of said fiduciary image exactly coincides with the boundary of said object image as determined visually by the relative brightness of areas at said boundaries, said apparatus enabling measurement of the width of said object by determination of the position of said calibrated mechanism at said null positions thereby avoiding the need to split a beam into two object images and to move said images relatively.

2. The apparatus as claimed in claim 1 including means for adjusting the brightness of said fiduciary image.

3. The apparatus as claimed in claim 1 including means for projecting alternative fiduciary images onto said field of view.

4. The apparatus as claimed in claim 1 wherein said first and second boundaries of said fiduciary image are fixed relative to each other with a predetermined spacing in the direction of said translation, said apparatus enabling measurement of the width of said object by determination of the movement of said calibrated mechanism between said null positions corrected by said spacing between said boundaries.

5. The apparatus as claimed in claim 4 including means for representing the distance between said null positions automatically corrected for the spacing between said fiduciary boundaries.

6. The apparatus as claimed in claim 1 including means to project said two images in contrasting colors.

7. The apparatus as claimed in claim 6 wherein said colors are complementary.

8. The apparatus as claimed in claim 1 wherein said fiduciary form comprises a dark area of visually appreciable width and uniform intensity disposed on a light background field of uniform intensity, opposite edges of said dark area providing said boundaries.

9. The apparatus as claimed in claim 8, said fiduciary image being in the form of a circular spot.

10. The apparatus as claimed in claim 9, said fiduciary image being in the form of a bar with parallel sides.

* * * * *